United States Patent

Mealey et al.

[11] Patent Number: 5,221,475
[45] Date of Patent: * Jun. 22, 1993

[54] FILTER SUPPORT

[75] Inventors: Andrew N. Mealey, 531 N. Gower St., Los Angeles, Calif. 90004; David E. Bailey, Anaheim, Calif.

[73] Assignee: Andrew N. Mealey, Los Angeles, Calif.

[*] Notice: The portion of the term of this patent subsequent to Aug. 7, 2007 has been disclaimed.

[21] Appl. No.: 740,730

[22] Filed: Aug. 6, 1991

[51] Int. Cl.⁵ ............................................. B01D 29/085
[52] U.S. Cl. ................................... 210/474; 210/479; 210/482; 210/497.2
[58] Field of Search ............... 210/464, 469, 473, 474, 210/477, 478, 479, 480, 481, 482, 497.2, 497.01, 448, 452

[56] References Cited

U.S. PATENT DOCUMENTS

| | | | |
|---|---|---|---|
| 484,459 | 10/1892 | Reynolds | 248/94 |
| 485,545 | 11/1892 | Holt | 141/344 |
| 486,762 | 11/1892 | Camden | 141/341 |
| 500,517 | 6/1893 | Thompson | 248/94 |
| 508,175 | 11/1893 | Leggett | 210/474 |
| 597,483 | 1/1898 | Talbert | 210/469 |
| 658,848 | 10/1900 | Hirsch | 248/94 |
| 970,398 | 9/1910 | Sapp | 210/473 |
| 1,599,835 | 9/1926 | Nelson | 210/474 |
| 2,315,842 | 4/1943 | Dariana | 210/474 |
| 2,572,963 | 10/1951 | Wily | 210/474 |
| 2,667,976 | 2/1954 | Weidner | 210/469 |
| 2,883,057 | 4/1959 | Richards | 210/476 |
| 2,907,052 | 10/1959 | Louis et al. | 210/464 |
| 3,480,148 | 11/1969 | Bryand | 210/497.3 |
| 4,025,435 | 5/1977 | Shea | 210/250 |
| 4,176,588 | 12/1979 | Baron | 99/323 |
| 4,290,888 | 9/1981 | Gartmann et al. | 210/474 |
| 4,721,567 | 1/1988 | Uram | 210/497.3 |
| 4,946,591 | 8/1990 | Mealey | 210/479 |

Primary Examiner—Robert A. Dawson
Assistant Examiner—W. L. Millard
Attorney, Agent, or Firm—Christie, Parker & Hale

[57] ABSTRACT

A strainer assembly for straining a liquid, such as paint, to be poured into a container includes a tubular strainer support having a continuous imperforate side wall structure with an open top, an open bottom, and an annular exterior flange for removably resting on the open top of the container for holding the strainer support in an upright position above the container. A filter medium, such as a mesh filtering cloth, is secured to the top of the support for holding it in the interior of the support above the container. Paint is poured through the filtering cloth to filter the paint before it passes into the container. In one embodiment, the strainer support includes an annular ridge recessed in the exterior side wall of the support adjacent the open top of the support to provide a second means for mounting the strainer support in an inverted position over a smaller-sized container. A further embodiment comprises a molded plastic support with integrally molded clips that can be broken off and used to hold the filter cloth in place. In a further embodiment, the strainer support is of stackable configuration in which an annular shoulder projecting into the upper interior portion of the support is adapted to engage the top lip of an identical tubular support when the two supports are stacked to provide an interference fit that avoids the tubular supports sticking together when positioned in a tall stack.

20 Claims, 8 Drawing Sheets

FILTER SUPPORT

CROSS-REFERENCE

This invention is related to the subject matter of my U.S. Pat. No. 4,946,591.

FIELD OF THE INVENTION

This invention relates to a strainer assembly, and more particularly, to apparatus for supporting a filter medium for use in filtering paint, although the invention has utility in filtering other materials, as well as uses in food processing.

BACKGROUND OF THE INVENTION

The background of this invention is described as it relates to the filtering of paint, although it will be understood from the disclosure to follow that the invention is also applicable to the filtering of other materials, as well as uses in food processing.

When professional painters use an airless spray gun, they first filter or strain the paint so it will not clog the tiny nozzle in the spray gun. Typically, the do-it-yourself user of an airless spray gun bought at the local hardware store is unaware that paint should be filtered before use. As a result, an airless spray gun is often clogged after a single use, after the paint in it has dried; and the spray gun cannot be reused unless a new nozzle is purchased and installed.

The present invention is a system that professional painters or do-it-yourself painters can use to strain or filter paint prior to using the paint in an airless spray gun.

In the prior art, professional painters have typically filtered paint prior to using the spray equipment by first placing a filter cloth inside an empty paint bucket. The painter then pours the paint into the interior of the filter cloth so the paint passes through the pores of the filter to strain the paint. Since the prior art filter cloth extends down to near the bottom of the bucket, the painter must pour the paint into the bucket and then pull the filter cloth up out of the bucket to ensure that all paint passes through the cloth and into the bucket. This job is inconvenient, messy, tedious, and places a strain on the painter's back when constantly filtering paint in this manner. The filter cloth is often pulled into the bucket by the weight of the paint, and consequently, unfiltered paint will spill into the bucket, slowing down the filtering process. A tapered bottom of the conventional filter cloth also can tend to cause the paint to clog the bottom of the filter cloth, which also slows down the filtering process. When the painter pulls the filter cloth upwardly from the bucket, the clogged bottom portion adds weight to the filter, placing a strain on the back of the painter, who must hold the filtering cloth over the bucket until all the paint has finally passed through it.

My U.S. Pat. No. 4,946,591 describes an improved filter support which solves these problems by making it possible to filter paint by pouring it through a filter cloth mounted inside the support which, in turn, rests in an upright position above the top of the bucket. The invention is especially useful in filtering paint quickly and easily. For straining paint, the strainer assembly is placed on top of an empty container, and the filter medium is simply taped to the exterior of the support for holding it in place inside the support and above the top of the container. The paint is then poured through the filter cloth so the paint passes through the filter and then into the container below relatively easily without clogging the bottom of the filter. No complex mechanical parts need to be assembled or disassembled, and filtering is done in a clean manner. Debris cannot enter the filtered paint, and the paint which has been filtered does not skin over during hot weather.

The present invention provides improvements to the filter supports disclosed in my '591 patent, and these improvements include reduced expenses in manufacturing the tubular support, providing a convenient means for attaching the filtering cloth to the support, and a useful means for stacking the strainer supports in a large stack without having the supports stick together in the stack.

SUMMARY OF THE INVENTION

Briefly, one embodiment of this invention provides a strainer support for straining liquid to be poured into the interior of either of two containers on which the support can be mounted. The strainer support has a tubular side wall with an open top and an open bottom, and a flange projecting outwardly from the tubular side wall of the support adjacent the open bottom of the support. The open bottom has a diameter greater than the diameter of the open top of the tubular support. The flange projects outwardly a sufficient distance so the flange can removably rest on the open top of the first container to hold the support in a stable position above the first container, with the open bottom of the support facing down toward the interior of the first container. An upwardly facing annular ridge is recessed in the exterior side wall of the tubular support adjacent the open top of the support. The annular ridge projects out a sufficient distance beyond the open top portion of the support side wall so that the support can be inverted to allow the annular ridge to removably rest on the open top of a second container of smaller diameter than the open top of the first container. This holds the inverted strainer support in a stable upright position above the second container. The upright support, in either position, provides a means for attaching a filter medium to the support and within the hollow interior space above either container for use in straining or filtering paint or other materials poured through the filter medium and into the container below.

In one embodiment of the invention, one or more clips are integrally formed with the flange of the support and are removable from the flange. The clip has an open space for clipping over a top lip of the support to releasably and frictionally hold a filter medium under tension to the top lip of the support, for mounting the filter medium inside the tubular support above a container. Preferably, a plurality of such clips are integrally molded to the flange and can be broken off by the user and then used to removably clip the filter support to either end of the strainer support. The clips also can be removably attached to the filter support when not in use.

In a further embodiment of the invention, the strainer support has a generally tapered outer wall extending between the relatively wider open bottom and the relatively smaller open top of the support. An annular shoulder is formed in the interior side wall of the support adjacent the open top, and this shoulder provides an interference fit with the top lip of another identical strainer support when stacking the strainer supports one on top of the other. By this stacking means, the strainer support provides a convenient means of supplying large numbers of strainer supports to building and construction supply stores. The stacked strainer supports are held on top of one another principally by the interference fit between the annular interior shoulder and the upper lip of the other support stacked below it, thereby avoiding frictional contact between the tapered sides of the supports. This interference fit provides a positive means for engaging the stacked supports and allows the uppermost support to be taken off the top of a stack without any frictional interference from the other strainer support stacked below it.

These and other aspects of the invention will be more fully understood by referring to the following detailed description and the accompanying drawings.

DETAILED DESCRIPTION

Figure 1:
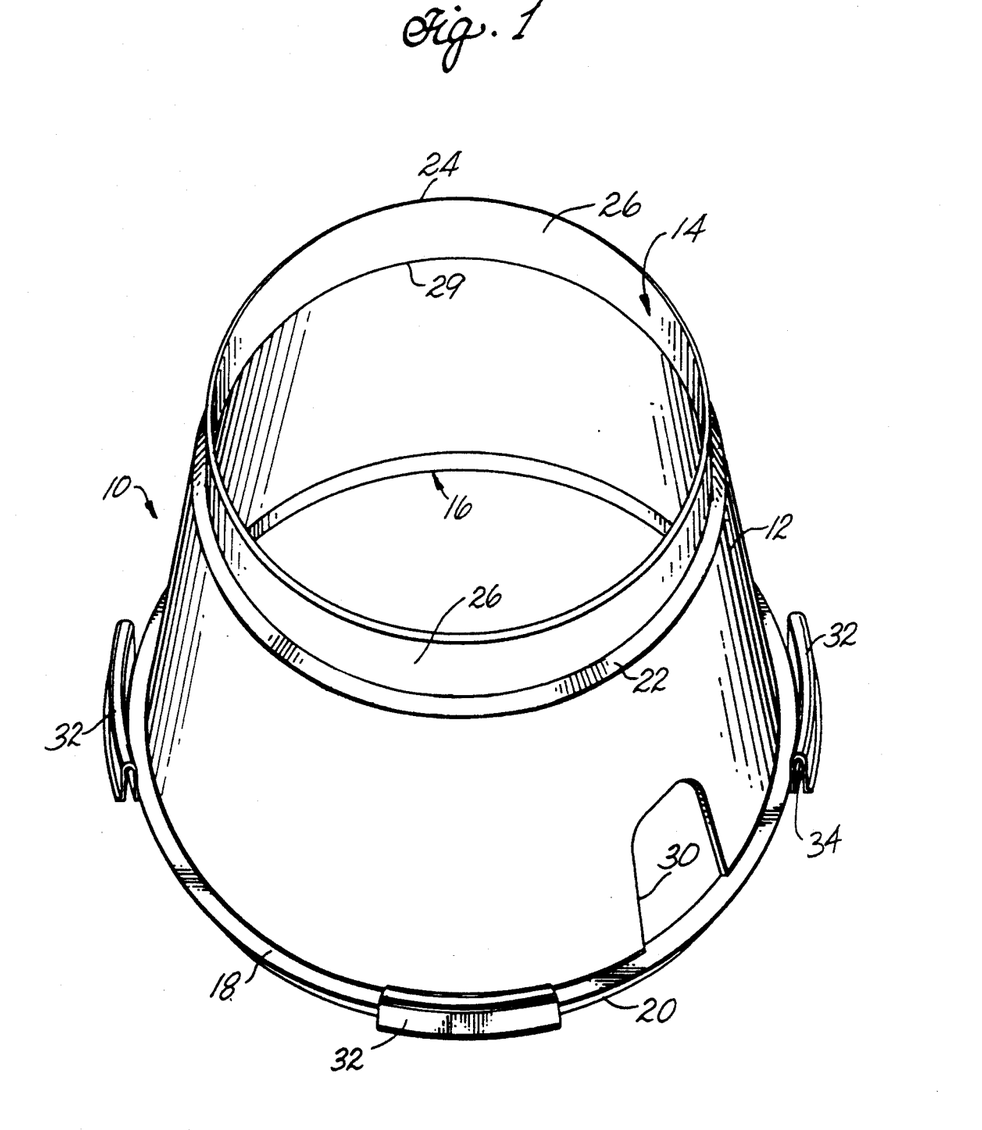
FIG. 1 is a top perspective view showing one embodiment of a tubular strainer support with integral mounting clips, according to principles of this invention.
Figure 2:
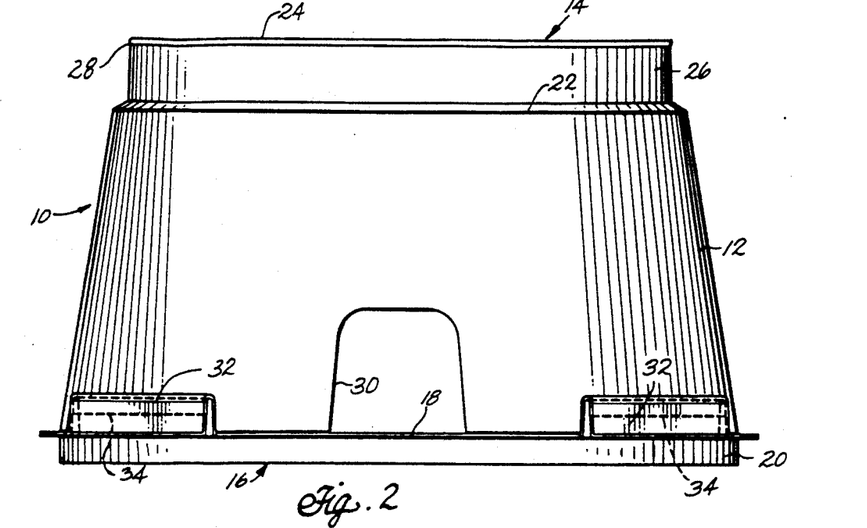
FIG. 2 is a front elevational view of the support shown in FIG. 1.
Figure 3:
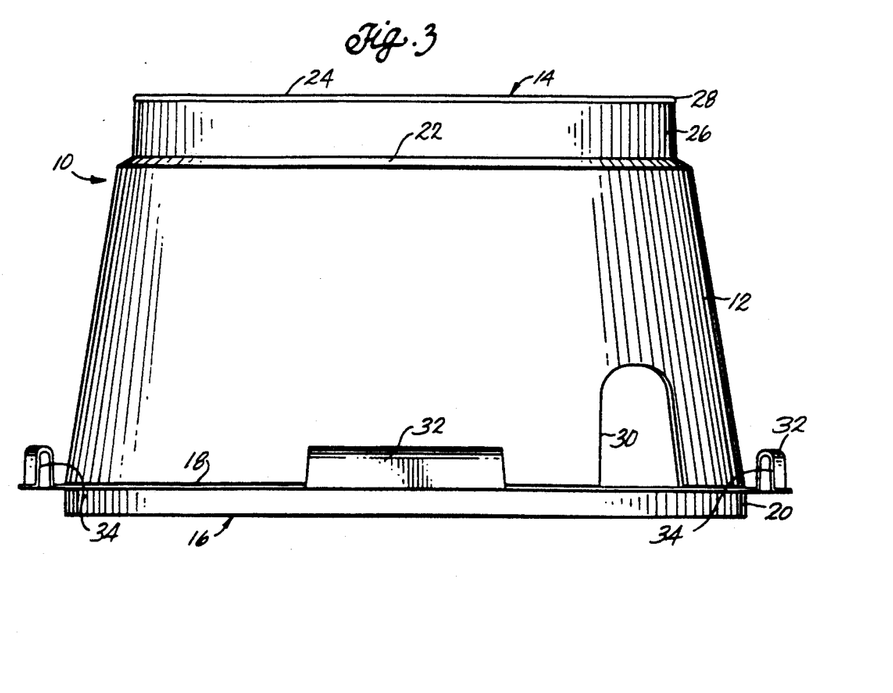
FIG. 3 is a front elevational view similar to FIG. 2, but rotated approximately 45°.

FIGS. 1-3 illustrate one embodiment of a strainer support 10 according to principles of this invention. The strainer support has a continuous, imperforate, tubular side wall 12, which is preferably frustoconical in shape and circular in cross section with a relatively smaller open top 14 and a relatively larger open bottom 16. The side wall of the strainer support is rigid axially so as to be self-supporting and provide sufficient structural strength for supporting the weight of a filter medium during use, as described below. The conical side of the strainer support is preferably made from an injection-molded plastic material commonly used in making plastic paint buckets. A typical wall thickness of the plastic strainer support is about 0.1 inch.

The exterior of the strainer support has an outwardly projecting lower mounting flange 18 located immediately above the annular bottom edge of the support. The lower flange is preferably integrally molded with the side wall of the support, is annular so as to extend entirely around the perimeter of the support, and has a flat bottom surface facing downwardly toward the open bottom of the support. Alternatively, the lower flange can be in several segments, at the same elevation on the support. As shown best in FIGS. 2, 3 and 5, the bottom side wall of the support has a change in angle and forms a short annular lower lip 20 at the base of the support, below the flange 18. The short annular lip preferably has an upright, substantially vertical side wall extending downwardly below the flange 18.

The strainer support 10 further includes an upwardly facing, angularly disposed annular ridge 22 extending continuously around an upper portion of the side wall 12, a short distance below an annular top edge 24 of the tubular support. The annular ridge 22 is formed by molding it in the side wall of the support at the base of a recessed upper portion of the support formed by a short upper annular wall section 26. The recessed annular ring formed by the short side wall 26 at the top of the support preferably extends in an upright, substantially vertical direction between the top edge 24 of the support and the top of the recessed annular ridge 22. The top edge of the support preferably has an enlarged bead 28 of greater wall thickness circling the top of the support for adding rigidity to the top lip of the support, as well as providing a means for improving an interference fit during stacking, as described below. The bead also provides a means for locking into a clip 32 described below. As shown best in FIGS. 2 and 3, the recessed upper ridge 22 and the lower flange 18 extend substantially parallel to one another along common planes which, in turn, extend substantially perpendicularly to a vertical axis through the circular support structure.

The annular ridge 22 formed in the exterior side wall of the support also forms a complementary downwardly facing, angularly inclined, continuous annular shoulder 29 in the interior of the support side wall. The annular interior shoulder 29 projects outwardly below the inside wall portion of the short upper annular wall section 26. The interior annular ridge 29 is formed so that it lies in a plane parallel to the plane of the lower flange 18 and the plane of the upper edge 24 of the support structure.

The strainer support preferably has a small opening 30 in the side wall of the support adjacent the top of the lower flange 18. Preferably, the base of the opening is formed by the flange 18 to add rigidity to the opening, without the opening extending below the flange and along the lower lip 20 of the support. The opening allows a hose (not shown) from an airless spray gun to pass between the outside and inside of the strainer support during use. The opening also can allow for viewing of the paint level in the bottom of the paint container when a filter medium is attached to the strainer support and otherwise interferes with visibility to the inside of a container below. Alternatively, the filter support can be made without an opening.

A plurality of inverted U-shaped plastic mounting clips 32 are integrally molded with the outer edge structure of the lower flange 18. The clips are each elongated, have a curvature matching the curvature of the flange, and are preferably spaced apart circumferentially at intervals around the flange. In the illustrated embodiment, there are four integrally molded clips carried on the lower flange. The clips are carried on the lower flange by a breakaway connection that allows the clips to be severed from their connection to the flange prior to using the clips. Each clip is shaped to releasably fasten to the annular top lip 26 of the strainer support for frictionally holding a filter medium to the top edge of the support. Each clip is also adapted to clip over the bottom lip 20 of the support, when the support is inverted during use, as described below, for holding a filter medium to the lip 20. The clip is used by prying apart its sides to slip the opposite sides of the clip around the opposite faces of the lip at either end of the container. The narrow space in a clip is configured so that the clip, when in use, is held under tension to frictionally secure the filter medium in place on either lip of the support. As illustrated in FIGS. 2 and 3, the interior of each clip can have an elongated, inwardly projecting ridge 34, which extends the length of the clip. The ridge is adapted to apply additional frictional force to the filter for holding it in place on the support.

Figure 4:
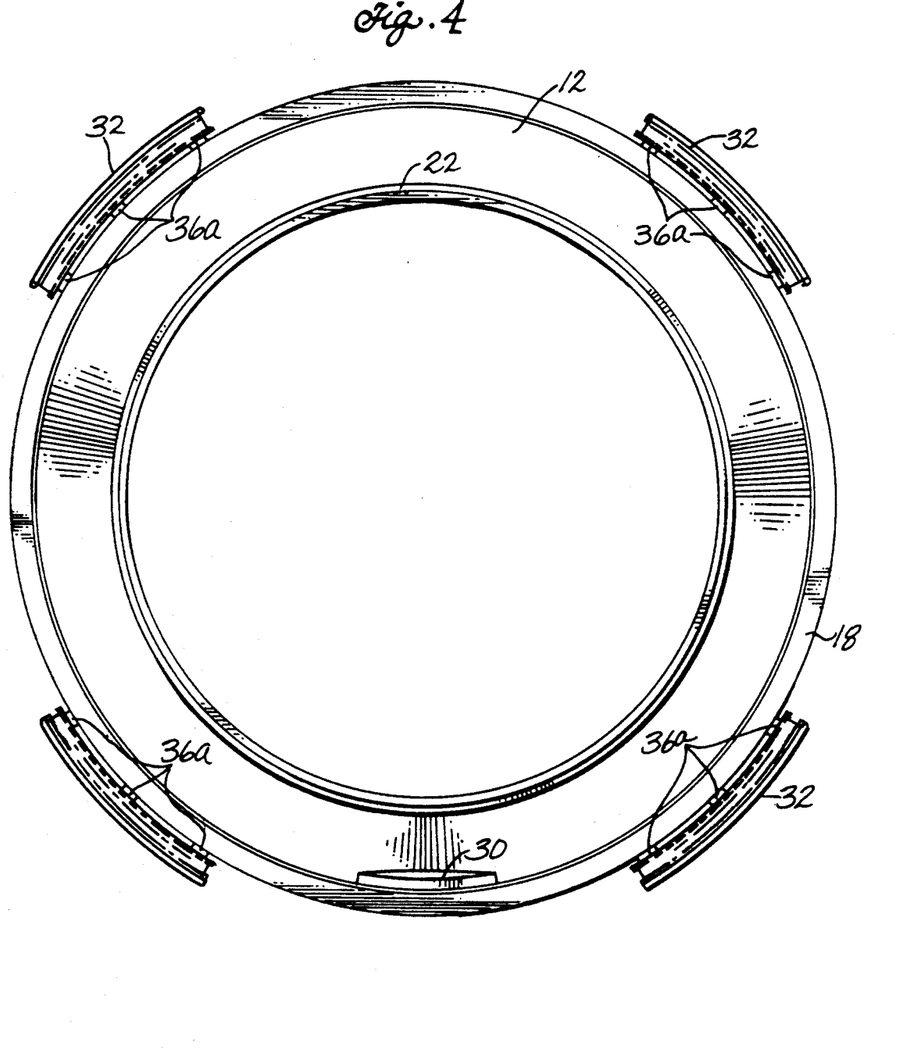
FIG. 4 is a top elevational view of the strainer support similar to that shown in FIG. 1, but showing an alternative embodiment for attaching clips to the side of the support.
Figure 5:
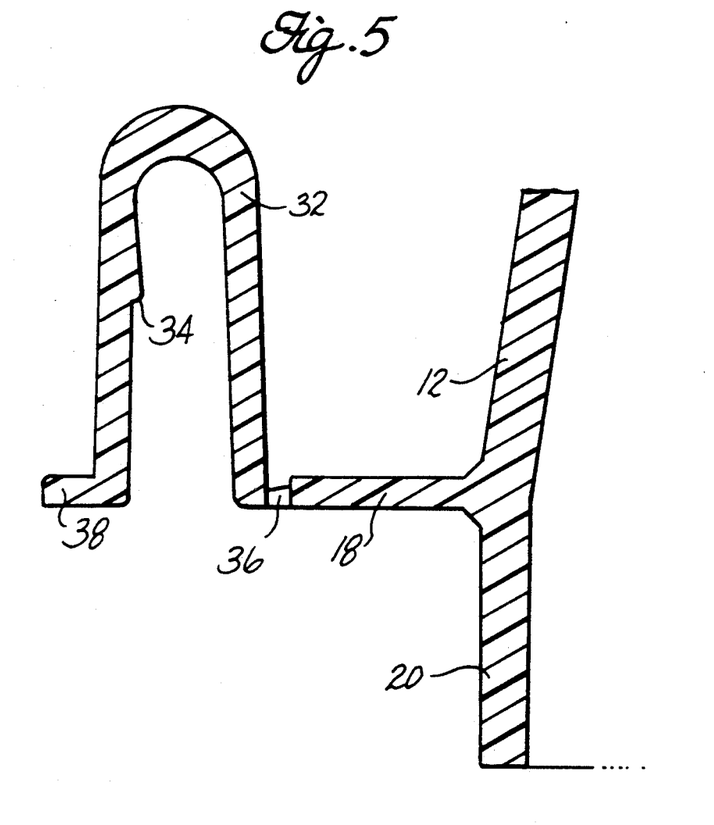
FIG. 5 is an enlarged fragmentary elevational view, partly in cross section, showing one technique for integrally molding a clip to the side of the support.

FIG. 5 schematically illustrates a preferred construction of the clip 32. This view shows the inverted U-shaped form of the clip 32 with the inwardly projecting ridge 34. This view also shows a preferred technique for molding the clips to the support. The inside edge of each clip 32 is integrally molded to the exterior of the flange 18 by an elongated, narrow plastic hinge 36. The bottom outer edge of the clip can have a short, outwardly projecting flange or foot 38. Prior to using the support, the clips are removed from the flange by severing their connection at the hinge 36. The outer flange 38 can be used as a means for applying a force that breaks the clip off the flange at the hinge connection 36. The material from which the clip is molded and the configuration of the hinge connection combine to provide a breakaway connection that allows the clip to be severed and removed from the flange by a back and forth action that fatigues the plastic connection to the flange. In one embodiment, the plastic hinge 36 can be continuous with the length of each clip, or, as illustrated in the embodiment of FIG. 4, short hinge connections 36a can be spaced apart along the length of the clip to provide multiple connections of shorter length. The flange or foot 38 on the clip is used to position the clip on the filter support during use and is used as a shelf for a mold removal tool during manufacturing. The cross section of FIG. 5 shows the clip in its configuration after it is taken out of the mold, before cooling. After cooling the free ends of the plastic shrink together and are closer together than shown in FIG. 5.

Figure 6:
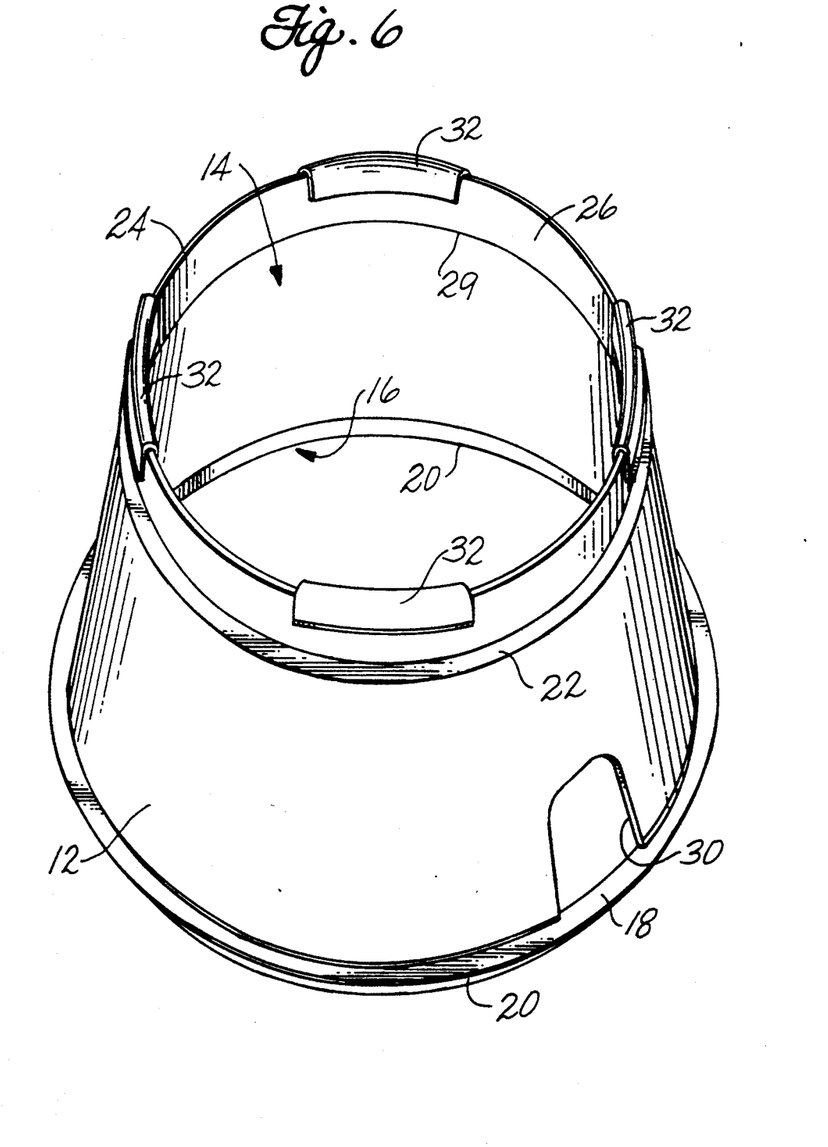
FIG. 6 is a top perspective view illustrating the removed mounting clips attached to the top of the support.

When the clips are removed from the outer flange, they are then used by clipping them over the top lip 26 of the container to hold a filter medium inside the support. In addition, and as shown in FIG. 6, the clips can be clipped to the top lip of the support to provide a means for retaining the clips when the strainer support is not in use. When the strainer support is to be used, the clips can be removed from the upper flange and used to clip a filter medium either to the top lip of the upright filter support 6, or the support can be inverted and the clips used to secure a filter medium to the annular lip 20 at the wider open end of the support.

Figure 7:
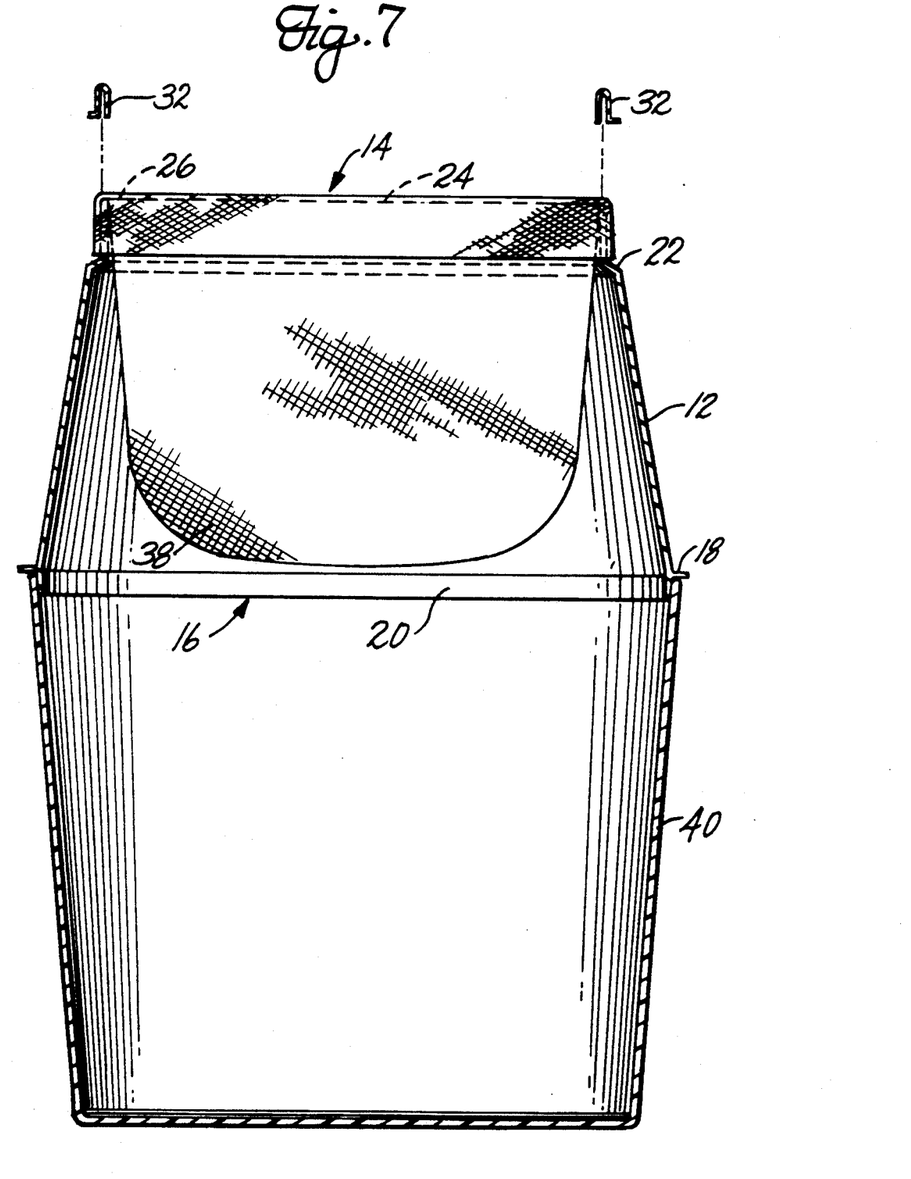
FIG. 7 is a cross sectional view illustrating a use of the strainer support holding a filter medium above a large container.
Figure 8:
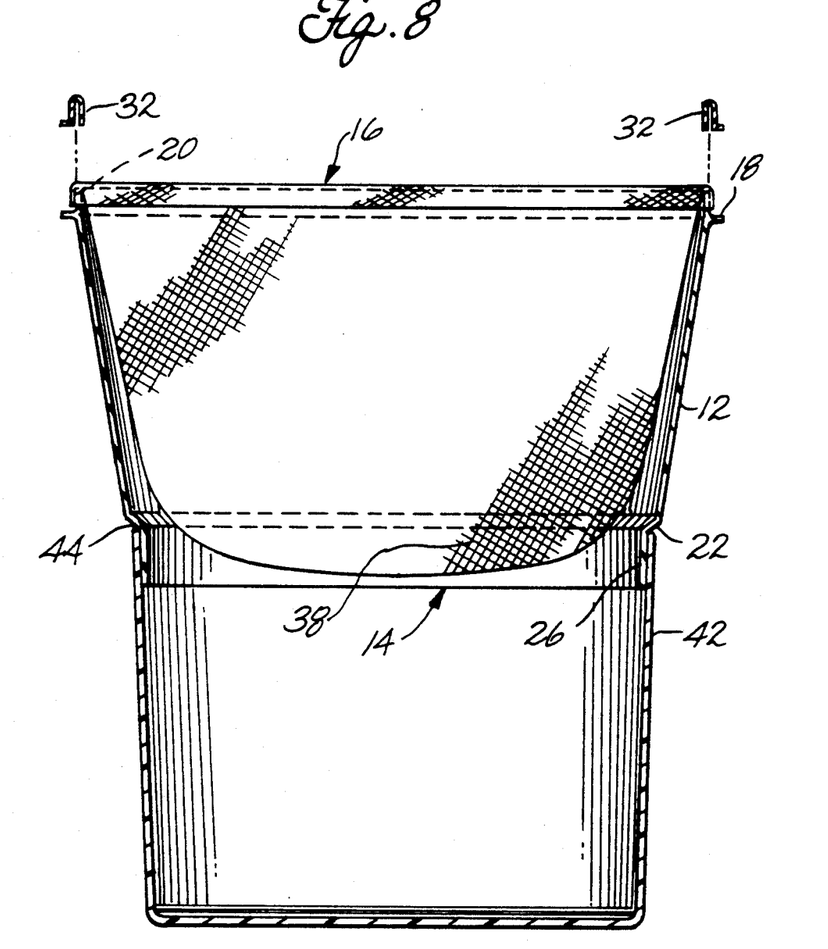
FIG. 8 is a cross sectional view illustrating use of the same tubular support as FIG. 7, but inverted and used for holding a filter medium above a smaller-sized container.

FIGS. 7 and 8 illustrate the strainer support, in use, mounting a tubular filter cloth 38 inside the support above the open top of a container 40. The filter cloth 38 is illustrated as a standard paint filtering cloth comprised of an elongated, porous, tubular bag made of cheesecloth or a plastic mesh, such as nylon or silicone, and having a closed lower end and an open top. Alternatively, the filter cloth can be any other type of filter medium, such as the combined tubular plastic bag and filter cloth bottom illustrated in my U.S. Pat. No. 4,946,591. The open top of the filter cloth is draped over the upper lip of the support, and the clips 32 are releasably secured to the filter cloth on the upper lip of the support for holding the filter cloth in place in the interior of the support, as illustrated in FIG. 7.

The strainer support is mounted in an upright position above the open top of the container. The filter cloth, after being releasably secured to the open top of the support, covers the entire open space within the interior of the support below the open top of the support. The clips hold the filter bag on the support with sufficient force so that the filter cloth is held in place for use in straining paint that can be poured through the interior of the filter bag, through the filter cloth, and into the interior of the container below. Preferably, the container is a 5-gallon paint bucket of the type commonly used commercially for containing paint. The strainer support is mounted on the top edge of the container by placing the open bottom of the strainer support inside the top of the container and resting the flat bottom surface of the flange 18 on the top edge of the container top. This removably mounts the strainer support in an upright position over the top of the container. As an alternative to securing the filter bag over the top of the strainer support, a length of masking tape (not shown) can be used to releasably fasten the top exterior portion of the filter bag to the upper annular lip on the strainer support. As a further alternative, a continuous ring-type clip (not shown) with an inverted U-shaped cross section can be slipped over the annular top lip of the support to provide a continuous means of support for the filter cloth.

The strainer support is configured in relation to the paint container to provide a highly stable means of support. As shown best in FIG. 7, the bottom annular edge at the lower opening in the support makes contact with the tapered inside wall of the container when the bottom of the flange rests on the top edge of the container. The support can be forced down inside the container, and the semi-rigid lip on the bottom of the support below the flange can flex inwardly and apply a somewhat spring-like friction force to hold the bottom of the strainer support in a fixed, stable position on top of the container. This prevents the strainer support from having lost motion at the top of the container and prevents the support from accidentally tipping over or being knocked off the top of the container from an external lateral force during use.

FIG. 8 illustrates a further use of the strainer support which can be inverted to provide a means for holding the filter cloth 38 above the top of a smaller container, such as a 2-gallon container 42. In this instance, the recessed ridge 22 is used as an outwardly projecting shoulder, shown in FIG. 8, for engaging the top lip 44 on the smaller container 42 to hold the inverted strainer support in a stable upright position on top of the smaller container 42. The recessed ridge 22 is thus able to act as a lower mounting flange to mount the strainer support on the annular top edge of the smaller container. The filter is then placed inside the inverted strainer support and secured to the top of the support by various means, which can include the clips 32 described previously. Alternatively, the top of the filter cloth can be draped over the outwardly projecting flange 18, which is now at the top of the container, and a length of adhesive tape or the like can be used for taping a top position of the filter bag to the side wall of the support on the bottom side of the flange for holding the filter bag in place inside the support and above the smaller container.

The description with respect to the 5-gallon and 2-gallon containers is an example only, since other large and small containers of different sizes also can be accommodated by the invention.

Thus, the invention is useful in straining paint in a manner which can be accomplished quickly and easily. The strainer support is simply placed on top of the paint container, and no complex mechanical parts need to be assembled or disassembled when mounting the strainer support or removing it. Further, the filter medium is simply used by clipping it to the top of the strainer support so that, again, no complex mechanical parts need to be assembled or disassembled during use. The filter support can be used in either of two positions to fit different sized containers. When filtering is completed, the clips can be removed and clipped to the top of the unused support, as illustrated in FIG. 6. The invention is also reasonably inexpensive to manufacture inasmuch as the strainer support can be made from a commonly available plastic material used in making paint buckets.

Figure 9:
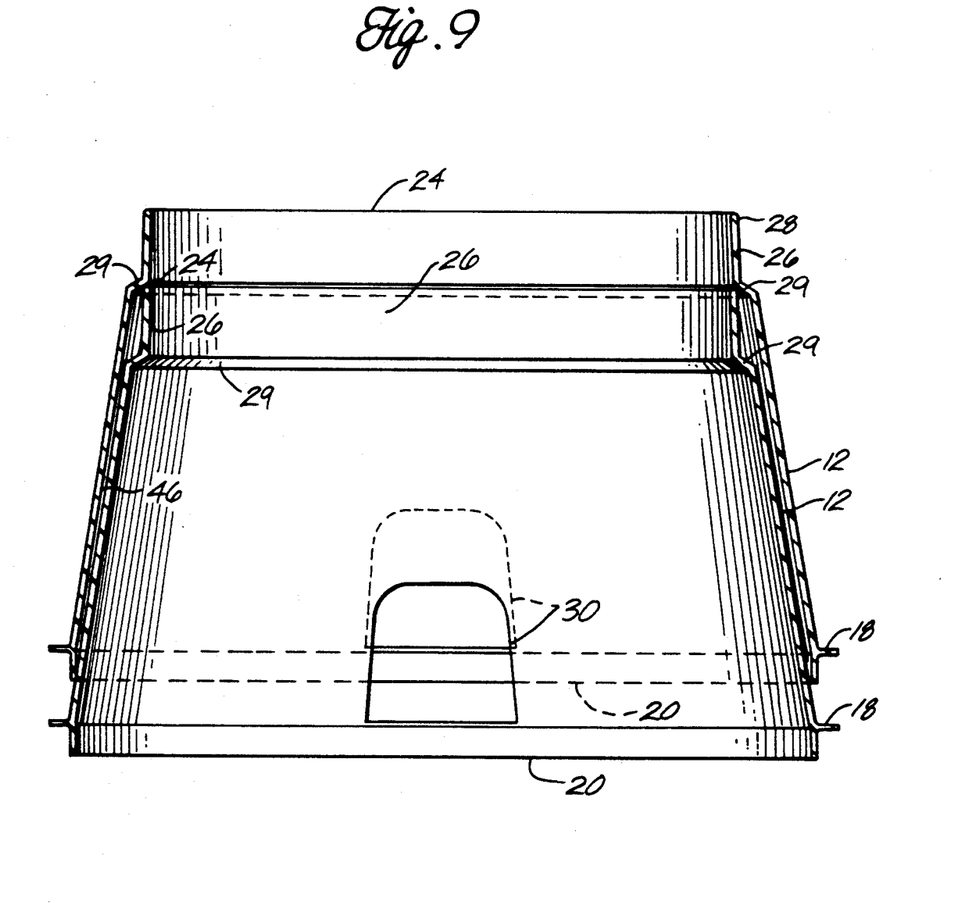
FIG. 9 is a cross sectional view illustrating a pair of stacked strainer supports to principles of this invention.

The strainer support is of stackable configuration, as illustrated in FIG. 9. A second similar strainer support can be stacked on top of the first support by simply slipping the larger open bottom end of the second support over the narrower upper end of the first support. The second support is moved downwardly for most of the vertical height of the support until the annular shoulder 29 inside the upper portion of the support engages the annular top edge 24 of the support stacked below it. This interference provides a stop which holds the stacked second strainer support on top of the first support stacked below it. The enlarged bead 28 on the vertical top lip of the container projects out to enhance the interference fit. By this stacking means, the strainer support provides a continuous means of supplying large numbers of the strainer supports to building and construction supply stores. The stacked strainer supports are held on top of one another principally by the interference fit between the annular top edge 24 of each support and the step provided by the inner annular shoulder 29 of the support stacked above it. This interference between the inner shoulder 29 and the top of the support stacked below it provides a positive means for engaging the stacked supports and allows the uppermost support to be taken off the top of the stack without any frictional interference from the other strainer supports stacked below it. For instance, as illustrated in FIG. 9, the tapered side walls 12 of the stacked tubular supports are shown spaced apart with a narrow spacing 46 between them on the stack.

The invention has been described with respect to presently preferred embodiments, although other variations are possible without departing from the scope of the invention. For example, plastic molding procedures could be adopted to form the clips 32 so they are molded to other parts of the support in addition to the bottom flange. The stacking arrangement shown in the figures excludes the molded clips 32, but the arrangement using the clips, as in FIG. 1, also can be stacked without the clips interfering with the stacking process.

Although the invention is described in relation to its use in filtering paint, other materials can be filtered using the same procedures described above. In addition, the strainer support and filter can be used in food processing. For instance, the support can be mounted on the top of a cooking vessel and a food grade filter cloth can be fastened to the support and extend through the interior of the support and into the cooking vessel for holding food products cooked or boiled in a liquid contained in the cooking vessel. Uses of the invention include straining milk; making wine or beer; filtering honey; draining cheese; making jelly, soups or spaghetti; or straining other food products.

What is claimed is:

1. A support for straining liquid to be poured into the interior of either of two containers, each having a respective open top of a known diameter, comprising:
    a strainer support having a tubular side wall with an open top and an open bottom;
    a flange projecting outwardly from the tubular side wall of the support adjacent the open bottom of the support, the open bottom having a diameter greater than the diameter of the open top of the tubular support, the flange projecting outwardly a sufficient distance so the flange can removably rest on the open top of a first container to hold the support in an upright position above the first container, with the open bottom of the support facing downwardly toward the interior of the first container;
    an upwardly facing annular ridge recessed in the exterior side wall of the tubular support adjacent the open top of the support, the annular ridge projecting outwardly a sufficient distance beyond the open top of the support so that the support can be inverted to allow the annular ridge to removably rest on the open top of a second container of smaller diameter than the open top of the first container, to thereby hold the inverted strainer support in an upright position above the second container, the upright support in either position providing a means for mounting a filter medium in the hollow interior space of the support above either container.

2. Apparatus according to claim 1, in which the tubular support has an annular top lip above the recessed ridge, and including one or more clips integrally formed with the flange and removable from the flange, the clip having an open space for clipping over the top lip of the support to releasably hold a filter medium to the top lip of the support when mounting the filter medium inside the tubular support.

3. Apparatus according to claim 2, including a plurality of said clips integrally formed with the flange.

4. Apparatus according to claim 1, including an opening in the side wall of the tubular support above the flange to allow a hose to extend from the interior of the container to the exterior of the strainer support, the opening having a continuous portion of the flange at its base to reinforce the wall of the support at the base of the opening.

5. Apparatus according to claim 1, in which the tubular support is of frustoconical shape.

6. A strainer assembly for straining liquid to be poured into the interior of either of two containers, each having a respective open top of a known diameter, comprising:
    a strainer support having a tubular side wall with an open top and an open bottom;
    a flange projecting outwardly from the tubular side wall of the support adjacent the open bottom of the support, the open bottom having a diameter greater than the diameter of the open top of the tubular support, the flange projecting outwardly a sufficient distance so the flange can removably rest on the open top of a first container to hold the support in an upright position above the first container with the open bottom of the support facing downwardly toward the interior of the first container;

an upwardly facing annular ridge recessed in the exterior side wall of the tubular support adjacent the open top of the support, the annular ridge projecting outwardly a sufficient distance beyond the open top of the support so that the support can be inverted to allow the annular ridge to removably rest on the open top of a second container of smaller diameter than the open top of the first container, to thereby hold the inverted strainer support in an upright position above the second container; and a filter medium for mounting inside the strainer support above either container by releasable attachment of the medium to the end of the support opposite from the container.

7. The assembly according to claim 6, in which the tubular support has an annular top lip above the recessed ridge, and including one or more clips integrally formed with the flange and removable from the flange, the clip having an open space for clipping over the top lip of the support to releasably hold the filter medium to the top lip of the support when mounting the filter medium inside the tubular support.

8. The assembly according to claim 7, including a plurality of said clips integrally formed with the flange.

9. The assembly according to claim 7 in which the tubular support and the flange are made of molded plastic material, and the clip is made of plastic molded to the flange and removable therefrom by a breakaway connection.

10. Apparatus according to claim 2 in which the tubular support and the flange are made molded plastic material, and the clip is made of plastic molded to the flange and removable therefrom by a breakaway connection.

11. The assembly according to claim 6, including an opening in the side wall of the tubular support above the flange to allow a hose to extend from the interior of the container to the exterior of the strainer support, the opening having a continuous portion of the flange at its base to reinforce the wall of the support at the base of the opening.

12. The assembly according to claim 6 in which the tubular support is of frustoconical shape.

13. A strainer support for straining a liquid to be poured into the interior of either of two containers, each having a respective open top of a known diameter, the support comprising:

a tubular side wall with an open top and an open bottom, the open bottom having a diameter greater than the diameter of the open top;

a flange projecting outwardly from the tubular side wall of the support above the open bottom of the support, the flange projecting a sufficient distance so the flange can removably rest on the open top of a first container to hold the strainer support in an upright position above the first container, with the open bottom of the support facing down toward the interior of the first container;

an upwardly facing annular ridge recessed in the exterior side wall of the tubular support spaced below the open top of the support, the annular ridge projecting outwardly a sufficient distance beyond the open top of the support so the support can be inverted to allow the annular ridge to removably rest on the open top of a second container of smaller diameter than the open top of the first container, to thereby hold the inverted strainer support in an upright position above the second container, the strainer support in either position providing a means to hold a filter medium within the interior of the support above the first or second container, the annular ridge forming a downwardly facing annular shoulder on the interior side wall of the tubular support, said annular shoulder being adapted for resting on an annular top edge of a similar other strainer support stacked below it by an interference fit between the top edge of the other support and the downwardly facing shoulder, said interference fit providing a means to avoid substantial frictional content between the side walls of the two stacked strainer supports below the interference fit.

14. Apparatus according to claim 13, including an enlarged outwardly projecting bead at the top edge of the strainer support to enhance the interference fit.

15. Apparatus according to claim 13, in which the support has a short annular side wall extending in a substantially vertical direction above the exterior ridge and interior shoulder.

16. Apparatus according to claim 13, in which the side wall of the support is substantially frustoconical below the ridge for most of the length of the support.

17. Apparatus according to claim 16, in which the interference fit holds the frustoconical side walls spaced apart when stacked.

18. A support for straining liquid to be poured into the interior of a container, comprising:

a strainer support having a tubular side wall with an open top and an open bottom;

the support having an annular top lip surrounding the open top of the support;

a flange projecting outwardly from the tubular side wall of the support adjacent the open bottom of the support, the open bottom having a diameter greater than the diameter of the open top of the tubular support, the flange projecting outwardly a sufficient distance so the flange can removably rest on the open top of the container to hold the support in an upright position above the container, with the open bottom of the support facing downwardly toward the interior of the container;

the support having one or more clips integrally formed therewith and removable therefrom, the clip having an open space therein for clipping over the top lip of the support to releasably hold a filter medium to the top lip of the support when mounting the filter medium inside the tubular support for straining a fluid material poured through the filter medium and into the container.

19. Apparatus according to claim 18 including a plurality of said clips integrally formed with the flange.

20. Apparatus according to claim 19 in which the tubular support and the flange are made of molded plastic material and the clip is made of plastic molded to the flange and removable therefrom by a break-away connection.

* * * * *